United States Patent Office 2,945,101
Patented July 12, 1960

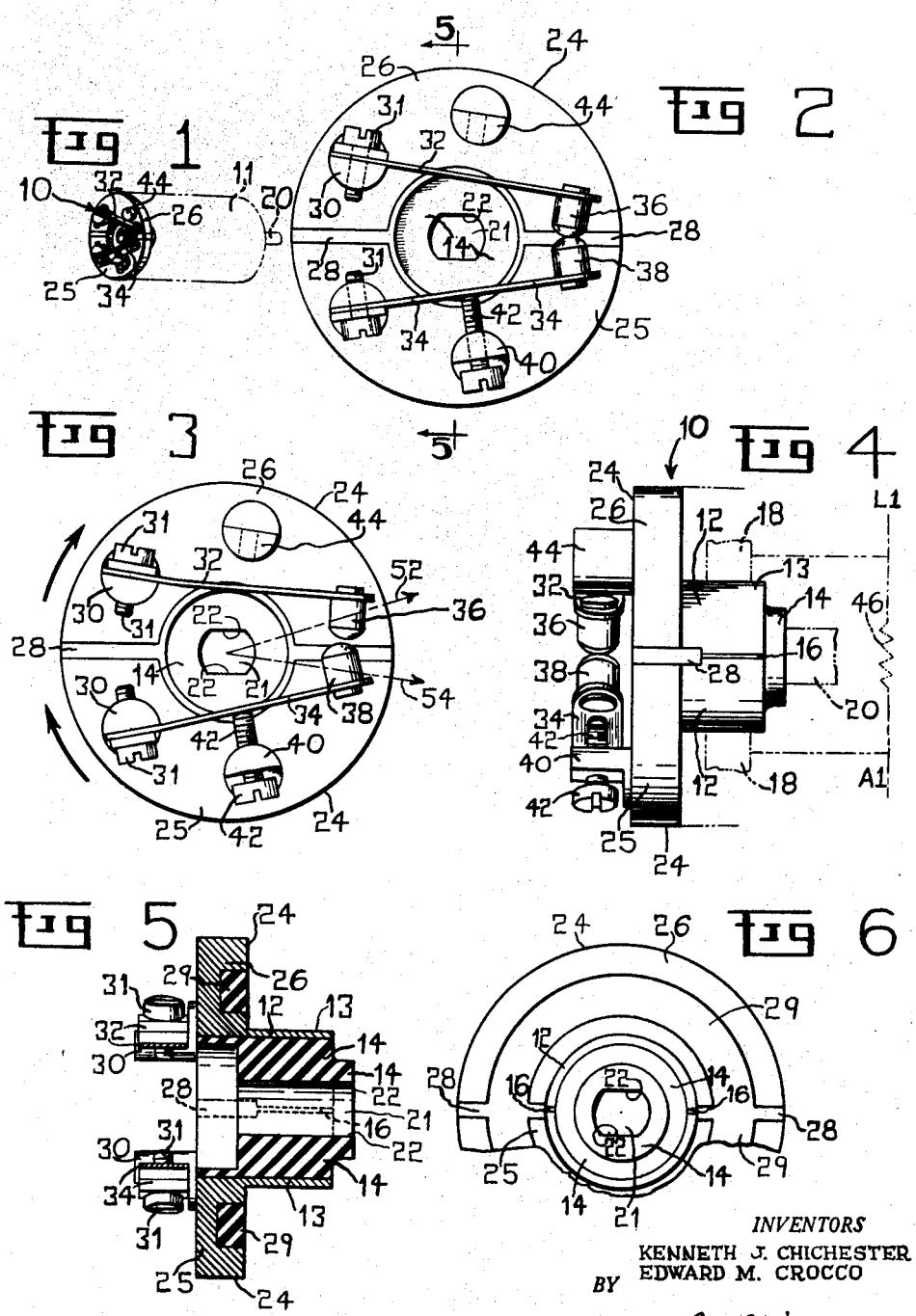

2,945,101

ROTATIONAL SPEED GOVERNOR

Kenneth J. Chichester, Stamford, and Edward M. Crocco, Greenwich, Conn., assignors to The Reflectone Corporation, Stamford, Conn., a corporation of Connecticut Filed Mar. 25, 1959, Ser. No. 801,838

1 Claim. (Cl. 200—80)

This invention relates to a rotational speed governor and more particularly has reference to a speed governor for very small motor, for instance, permanent magnet motors as used in battery-operated office machines, portable dictating machines, missile control systems and in many other and similar applications. This invention furthermore is related to improvements in the governor design as disclosed, for instance, in U.S. Letters Patent 2,846,541, issued August 5, 1958, to L. D. Evans et al., entitled "Rotational Speed Governor."

Rotational speed governors of the type indicated above must satisfy many requirements which are more or less unique. For instance, these small direct current motors operate at speeds of many thousand r.p.m., so that the governors are required to be dynamically balanced and to withstand high speed operation. In view of the small size of these motors, the governor assembly must be compact, occupy a minimum amount of space, yet be completely reliable. Moreover, a governor in this type of application is required to operate without maintenance, must comprise a minimum number of individual parts, and be inexpensive to manufacture. Last but not least, as the efficiency of this type of motor to a great extent depends upon the losses within the governor construction, the governor must be designed for a minimum amount of loss, particularly friction loss resulting from brush contact which establishes connection to the rotating governor assembly. Since the brush pressure is dictated by electrical considerations, a major improvement can be made by designing the governor in such a manner that the brushes engage the governor construction as near to the center of the rotation as possible. In this way, the torque loss (contact pressure times radial distance) is kept to a minimum.

The design disclosed in the patent referenced above, as well as in the construction revealed in application for U.S. Letters Patent, Serial No. 748,836, entitled "Governor for Small Motors," filed July 16, 1958, now U.S. Patent No. 2,886,666, issued May 12, 1959, meet substantially all the requirements enumerated. However, careful investigations and tests carried out on the designs described, as well as on most prior art devices, show that the governors are rotation sensitive. That is, the accuracy of speed regulation is dependent upon the direction of rotation of the governor assembly. For example, typical values are one percent accuracy of speed regulation in one direction and four to six percent regulation accuracy in the opposite direction. It will be obvious that the one percent value may suffice in most applications, while the latter value frequently exceeds acceptable tolerance limits.

A careful analysis of this problem has shown that this change in the accuracy of speed regulation is caused by the disposition of the interrupting contact on the governor assembly. When the interrupting contact, specifically the free-moving contact leaf, is positioned at the trailing edge, the forces effective on the contact as caused by acceleration and deceleration of the governor assembly are such as to promote very accurate speed regulation. When the flexible contact is positioned, however, at the leading edge, the same forces impede precise speed regulation.

Considerable improvements in accuracy of speed regulation can be achieved by designing certain speed governors in such a manner that when employing a pair of contacts, either contact may be rendered to be a fixed contact, that is, a contact which is restrained from moving under the influence of centrifugal forces. Depending upon the rotation of the speed governor, it then is necessary to impede motion of that contact which will be positioned at the trailing edge of the rotating assembly. Details of this arrangement will be explained in the following description.

One of the objects of this invention, therefore, is the provision of a new and improved governor which is designed to avoid one or more of the disadvantages and limitations of prior art devices.

Another object of this invention is the provision of a governor design which provides very precise speed regulation for either direction of rotation.

Another object of this invention is the provision of a rotational speed governor which may be assembled for either clockwise or counter-clockwise rotation and when assembled properly, will provide very precise speed regulation.

Another object of this invention is the provision of a governor design which is characterized by a minimum number of parts.

A further object of this invention is the provision of a governor design which is compact in its configuration and, therefore, requires a minimum amount of space.

Further and other objects of this invention will become apparent by reference to the following specification taken in conjunction with the accompanying drawings in which:

Figure 1 is a perspective view showing a rotational speed governor of this invention attached to a motor;

Figure 2 is an enlarged and elevational view showing the contact fingers of the governor of this invention when the rotor of the motor is at a speed less than the operating speed of the governor;

Figure 3 is an elevational view similar to that of Figure 2. However, Figure 3 shows the contact fingers of the governor in positions which they must assume momentarily during governor operation of the device;

Figure 4 is an enlarged side elevational view of the speed governor per this invention;

Figure 5 is a sectional view taken substantially along line 5—5 of Figure 2, and Figure 6 is a fragmentary and elevational view of the speed governor of this invention looking at the governor from the opposite end form that shown in Figures 2 and 3.

Referring now to the drawings in detail, a rotational speed governor 10 of this invention may be attached to any suitable rotational device, such as motor 11 shown in Figure 1. The rotational speed governor 10 comprises a pair of substantially semi-circular segments 12, forming a hollow cylinder 13 similar in appearance to a commutator. The segments are firmly attached to a sleeve 14 made of any suitable insulating material which is relatively unaffected by heat and/or moisture. Sleeve 14 may extend axially beyond the length of the segments 12 as shown in Figures 4 and 5. The straight edges of the segments 12 are slightly separated one from the other so that a narrow space 16 exists between the two segments 12, as shown in Figures 4, 5 and 6. The segments 12 are thus electrically insulated one from the other. Cylinder 13 is adapted to be engaged by a pair of suitable brushes 18.

Sleeve 14 is adapted to attach the segments 12 to shaft 20. The sleeve 14 has a bore 21 extending therethrough. Bore 21 has two flat surfaces 22 for engagement with complementary flat surfaces of the shaft 20. Any suitable means such as a clip ring or snap ring (not shown) may be used to retain sleeve 14 upon shaft 20 against axial movement.

Attached to cylinder 13 at one end thereof there is a disk 24 in the form of a pair of arcuate concentric flange members 25 and 26 separated by spacer strips 28. The spacer strips 28 are integrally attached to the sleeve 14 and are made of the same material as annular ring 29 which is embedded within flange members 25 and 26 of the disk 24. The ring 29 also integrally joins the spacer strips 28, as clearly shown in Figure 6. Flange member 25 is integrally attached to one of the segments 12; the flange member 26 is integrally attached to the other segment 12, as best seen in Figures 4 and 5. Segments 12 and flanges 25 and 26 are preferably made of suitable conductor material, such as copper and the like.

Due to the fact that sleeve 14, ring 29, and spacer strips 28 are all integral, flange members 25 and 26 with segments 12 are firmly retained in concentric relation. The governor assembly, therefore, withstands high centrifugal forces without relative movement between the individual parts forming the assembly.

Integrally attached to each of the arcuate flange members 25 and 26 is a conductor stud 30 extending in a direction parallel to shaft 20. Attached to one conductor strip 30 by means of a screw 31 there is a flexible resilient finger 32. Attached to the other conductor stud 30 by means of a similar screw 31 there is a flexible resilient finger 34. The flexible resilient fingers 32 and 34 are made of suitable resiliently flexible conductor material and are attached at the ends thereof to their respective conductor studs 30. Fingers 32 and 34 extend across the flange members to which they are attached and terminate adjacent to the periphery thereof as shown in Figures 2 and 3.

Finger 32 is provided with a contact 36 at the end thereof and finger 34 is provided with a contact 38 at the end thereof. Contacts 36 and 38 are normally in engagement one with the other as shown in Figure 2.

Due to the fact that both of the fingers 32 and 34 are resilient and flexible, the fingers 32 and 34 when resiliently engaged one with the other, act as one long resilient member. The effective resilient length of the one long resilient member formed by the engaged fingers 32 and 34 is substantially equal to the combined resilient lengths of fingers 32 and 34.

Attached to flange member 25 is a stud 40 to which is threadedly attached a radially extending adjustment screw 42. The end of the adjustment screw 42 is adapted to abuttingly engage the central portion of the resilient finger 34 for adjustment of the resilient position of finger 34. Adjustment of the adjustment screw 42 changes the resilient stresses applied to finger 34 and, consequently, the stresses within both the fingers 34 and 32.

A similar stud 44 is attached to flange member 24 and is adapted to receive the same or a similar screw 42 depending upon whether the preferred rotation of the governor assembly is in the opposite direction as will be explained later. Nonetheless, it will be understood that either of the contact fingers may be engaged by suitable adjustment means 42 and that either flange member may be provided with such means as to render its associated contact finger incapable of outward motion if urged in such motion by the centrifugal forces effective upon the resilient contact fingers due to rotation of the assembly.

Segments 12 of cylinder 13 and flange members 25 and 26 of the disk 24 serve as conductor means between brushes 18 and fingers 32 and 34. Due to the fact that the spaces 16 and the insulating material 28 separate the segments 12 and the flange members 25 and 26 one from the other, there is direct electrical connection between the segments 12 only when the contacts 36 and 38 of the fingers 32 and 34 are engaged one with the other.

Preferably, brushes 18 are connected across a resistance 46 shown schematically in Figure 4 which is electrically in series with a line conductor L–1 and an armature conductor A–1 supplying electrical energy to the motor 11. As contacts 36 and 38 of fingers 32 and 34, respectively, are normally in engagement one with the other, resistance 46 connected across the brushes 18 is normally shorted out.

When motor 11 is started, shaft 20 is caused to increase in speed. Therefore, the centrifugal forces associated with the elements rotating with the shaft 20 increase. As the speed of the shaft 20 approaches a predetermined value, centrifugal forces acting upon fingers 32 and 34 tend to cause contacts 36 and 38 to separate one from the other. Finger 34, being engaged by the screw 42 at the midportion thereof, has a shorter effective length in which to flex than does the finger 32. Thus, contact 36 of finger 32 tends to move outwardly more readily than does contact 38 of finger 34. Centrifugal forces acting upon contacts 36 and 38 are substantially along radial lines, as indicated by arrows 52 and 54 in Figure 3. As centrifugal force causes outward movement of contact 36, the resilient action of the finger 34, as determined by the adjusted position of the screw 42, may cause slight following movement by the contact 38. However, centrifugal force also tends to cause outward movement of the contact 38 substantially in a direction as shown by the arrow 54. Figure 3 shows separation of contacts 36 and 38, one from the other, as the fingers 32 and 34 flex under the influence of centrifugal forces.

The showing of the separation of the contacts 36 and 38 as depicted in Figure 3 may be somewhat exaggerated, due to the fact that during governing operation the contacts separate only slightly. When contacts 36 and 38 separate, even a slight distance, one from the other, the resistance 46 which is connected across the brushes 18 is automatically inserted into the motor armature circuit and the speed of the motor immediately decreases. As the speed of shaft 20 decreases, the centrifugal forces urging separation of the contacts 36 and 38 decrease. Therefore, the contacts 36 and 38 are again permitted to come into engagement one with the other. As engagement of the contacts 36 and 38 recurs, resistance 46 across brushes 18 is shorted out and the speed of the motor again increases until separation of the contacts 36 and 38 results.

Thus, it is understood that contacts 36 and 38 come into engagement one with the other and separate one from the other at a high frequency. Hence, the speed of the motor is maintained at substantially a constant value, as the contacts oscillate between open and closed position.

The governed speed or operational speed of the motor 11 can be adjusted by means of the setting of adjustment screw 42 which presses against the resilient finger 34. As the adjustment screw 42 presses against the finger 34, it establishes the adjusted position of the finger 34. As the pressure of the contact 38 against the contact 36 is increased, the amount of centrifugal force necessary to separate the contact 36 from the contact 38 increases. Therefore, the speed at which the motor operates increases.

Rotation arrows in Figure 3 indicate clockwise rotation and under these conditions, a regulation in the order of one percent accuracy is obtained. In order to obtain the same value of accuracy when operating the governor in counterclockwise rotation, screw 42 will be inserted into stud 44 so that the screw now restrains outward motion of contact finger 32 while permitting contact finger 34 to become the freely movable contact. The reason for using a preferred assembly, depending upon the direction of rotation, will be apparent from the following discussion:

Assuming that the governor is rotating in clockwise direction (Figure 3) and that the centrifugal forces effective upon contact fingers 32 and 34 are such that contact 36 of finger 32 is just about ready to engage the substantially stationary contact 38. As soon as the contacts engage one another, resistor 46 is shunted by shorted contacts connected in parallel, thus causing the motor to attain a sudden power surge which results in a sudden increase in rotational speed. This acceleration produces an almost instantaneous separation between contacts 36 and 38 and fingers 32 and 34, respectively, by virtue of the inertia of finger 32 and contact 36, which cannot without a certain and definite amount of time delay—although minute—follow the rotational speed of the substantially rigid contact 38 associated with finger 34. In this manner, during acceleration of the governor, the inertia of the free and unrestrained finger and associated contact is utilized to cause quick opening of the electrical circuit. Similarly, once the contacts are separated, the governor assembly decelerates and the inertia of the free contact spring causes rapid closing of the respective contacts. The speed undulations, therefore, are kept within close tolerances by employing the moments of inertia in such a manner as to aid in the opening and closing of the contact assembly.

It will be apparent that in the event that rotation is opposite to the preferred manner described above, the moments of inertia become effective in such a manner as to impede close speed regulation by retaining the contact associated with the free finger in engagement with the fixed contact until the motor has attained such an increase in speed that the centrifugal force is large enough to overcome the inertia of the finger and then cause separation between the respective contacts. It will readily be apparent that this latter condition requires a much larger amount of speed increase and accounts, therefore, for greater speed undulations. Once the contact is opened, the closing of the contacts again will be delayed by the moment of inertia which tends to keep the contacts separated for a longer period of time. It may be stated generally, that in the preferred assembly the free contact finger, that is, the flexible resilient finger which is not restrained in its outward motion should be disposed at the trailing edge. In the assembly described hereinbefore, depending upon the direction of rotation, provisions are made that either one of the two fingers can be made to be restrained or unrestrained, thus taking advantage of the moments of inertia to aid in contact opening or closing.

By designing governor assemblies in such a manner as to take advantage of the inherent moment of inertia of the contacts, it has been possible to provide consistently governors maintaining a speed regulation of one percent or better for either direction of rotation.

Although a preferred embodiment of the device has been described, it will be understood by those skilled in the art that various changes and modifications may be made therein without deviating from the principle and intent of the present invention which shall be limited only by the scope of the appended claim.

What is claimed is:

A speed control device comprising: a rotatable body which includes a pair of similar concentric arcuate segments electrically insulated one from the other forming a part of the body, a pair of resilient fingers, there being one finger attached to each of the segments, each finger being attached at one end thereof to its respective segment, the other end of the fingers being in resilient engagement one with the other when the rotational speed of the body is below a predetermined value, centrifugal forces causing separation of the fingers when the rotational speed of the body is above a predetermined value, a pair of contact brushes in contact with the segments, each segment provided with support means adapted to be fitted with adjustable screw means which engage the associated contact finger for selectively effecting a bias thereon, said bias opposing the forces caused by centrifugal forces on one of the respective contact fingers, and said bias being capable to be rendered effective upon the contact finger which depending upon the direction of rotation is disposed at the leading edge of the rotating body.

References Cited in the file of this patent

UNITED STATES PATENTS

| 1,855,703 | Cloud | Apr. 26, 1932 |
| 2,175,837 | Hanna | Oct. 10, 1939 |
| 2,846,541 | Evans et al. | Aug. 5, 1958 |
| 2,886,666 | Chichester | May 12, 1959 |